(12) United States Patent
Baker

(10) Patent No.: US 11,318,702 B2
(45) Date of Patent: May 3, 2022

(54) HYBRID COMPOSITE PANEL AND METHOD

(71) Applicant: Wabash National, L.P., Lafayette, IN (US)

(72) Inventor: Leonard W. Baker, Lafayette, IN (US)

(73) Assignee: Wabash National, L.P., Layfayette (IN)

( * ) Notice: Subject to any disclaimer, the term of this patent is extended or adjusted under 35 U.S.C. 154(b) by 0 days.

(21) Appl. No.: 16/486,096

(22) PCT Filed: Feb. 14, 2018

(86) PCT No.: PCT/US2018/018151
§ 371 (c)(1),
(2) Date: Aug. 14, 2019

(87) PCT Pub. No.: WO2018/152180
PCT Pub. Date: Aug. 23, 2018

(65) Prior Publication Data
US 2020/0009823 A1    Jan. 9, 2020

Related U.S. Application Data

(60) Provisional application No. 62/458,682, filed on Feb. 14, 2017.

(51) Int. Cl.
*B32B 3/12* (2006.01)
*B32B 3/20* (2006.01)
(Continued)

(52) U.S. Cl.
CPC .................. *B32B 3/12* (2013.01); *B32B 3/20* (2013.01); *B32B 5/02* (2013.01); *B32B 15/04* (2013.01);
(Continued)

(58) Field of Classification Search
None
See application file for complete search history.

(56) References Cited

U.S. PATENT DOCUMENTS 2,294,930 A   9/1942   Palmquist, V
2,719,809 A   10/1955  Herts
(Continued)

FOREIGN PATENT DOCUMENTS

CA   2165016 A1   6/1996
EP   2133184 A1   12/2009
(Continued)

OTHER PUBLICATIONS

Non-Final Rejection dated Sep. 1, 2009, for U.S. Appl. No. 11/859,014, 8 pages; obtained from USPTO records, now U.S. Pat. No. 9,908,315.
(Continued)

*Primary Examiner* — David Sample
*Assistant Examiner* — Elizabeth Collister
(74) *Attorney, Agent, or Firm* — Quarles & Brady LLP

(57) ABSTRACT

A method of producing a core for a composite panel along a continuous production line is disclosed. The method includes the steps of providing a thermoplastic sheet of material onto the production line and vacuum forming the thermoplastic sheet of material into alternating pairs of matching shapes, providing the thermoplastic sheet of material with alternating pairs of matching shapes onto upper and lower conveyor belts that are operating at lower speeds than the production line causing the pairs of matching shapes to bunch up and form a honeycomb structure, and cutting the honeycomb structure into discrete sections with spaces therebetween. A plurality of reinforced plastic bands with gaps therebetween are provided and the honeycomb struc-
(Continued)

ture is aligned with the gaps. The plurality of reinforced plastic bands and the honeycomb structure are secured together.

13 Claims, 15 Drawing Sheets

(51) Int. Cl.
  *B32B 5/02* (2006.01)
  *B32B 15/04* (2006.01)
  *B32B 37/14* (2006.01)
(52) U.S. Cl.
  CPC ...... *B32B 37/146* (2013.01); *B32B 2260/021* (2013.01); *B32B 2260/046* (2013.01); *B32B 2605/00* (2013.01)

(56) References Cited

U.S. PATENT DOCUMENTS

| | | | |
|---|---|---|---|
| 2,934,372 A | 4/1960 | Jewell | |
| 3,072,225 A | 1/1963 | Cremer | |
| 3,249,659 A | 5/1966 | Voelker | |
| 3,420,023 A | 1/1969 | Gregori | |
| 3,515,615 A | 6/1970 | Okada | |
| 3,617,351 A | 11/1971 | Long | |
| 3,817,671 A | 6/1974 | Lemelson | |
| 4,128,369 A | 12/1978 | Kemerer et al. | |
| 4,340,129 A | 7/1982 | Salyers | |
| 4,557,100 A | 12/1985 | Gorges | |
| 4,578,297 A | 3/1986 | Duncan | |
| 4,701,369 A | 10/1987 | Duncan | |
| 4,708,757 A | 11/1987 | Guthrie | |
| 4,709,781 A | 12/1987 | Scherzer | |
| 4,783,287 A | 11/1988 | Eichberger et al. | |
| 4,796,397 A | 1/1989 | Capaul | |
| 4,817,264 A | 4/1989 | Worthing | |
| 4,879,152 A | 11/1989 | Green | |
| 4,930,266 A | 6/1990 | Calhoun et al. | |
| 4,940,279 A | 7/1990 | Abott et al. | |
| 5,042,395 A | 8/1991 | Wackerle et al. | |
| 5,066,531 A | 11/1991 | Legg et al. | |
| 5,186,996 A | 2/1993 | Alts | |
| 5,214,991 A | 6/1993 | Shimizu et al. | |
| 5,275,848 A | 1/1994 | Mito et al. | |
| 5,328,744 A | 7/1994 | Kaufmann et al. | |
| 5,507,405 A | 4/1996 | Thomas et al. | |
| 5,554,246 A | 9/1996 | Anwyll, Jr. | |
| 5,580,636 A | 12/1996 | Kampmann et al. | |
| 5,604,021 A | 2/1997 | Wagner | |
| 5,698,308 A | 12/1997 | Sumiya et al. | |
| 5,702,798 A | 12/1997 | Sugita et al. | |
| 5,718,965 A | 2/1998 | Shiroeda et al. | |
| 5,774,972 A | 7/1998 | Ehrlich | |
| 5,779,847 A | 7/1998 | Groeger | |
| 5,851,342 A | 12/1998 | Vydra et al. | |
| 5,860,693 A | 1/1999 | Ehrlich | |
| 5,888,612 A * | 3/1999 | Needham | B29C 70/086 |
| | | | 428/116 |
| 5,899,037 A | 5/1999 | Josey | |
| 5,919,545 A | 7/1999 | Giezendanner et al. | |
| 5,979,684 A | 11/1999 | Ohnishi et al. | |
| 5,997,076 A | 12/1999 | Ehrlich | |
| 6,007,890 A | 12/1999 | DeBlander | |
| 6,080,495 A | 6/2000 | Wright | |
| 6,199,939 B1 | 3/2001 | Ehrlich | |
| 6,220,651 B1 | 4/2001 | Ehrlich | |
| 6,266,865 B1 | 7/2001 | Ehrlich | |
| 6,276,748 B1 | 8/2001 | Gobessi et al. | |
| 6,355,302 B1 | 3/2002 | Vandenberg et al. | |
| 6,368,721 B1 | 4/2002 | Watanabe et al. | |
| 6,383,559 B1 | 5/2002 | Nakamura et al. | |
| 6,412,854 B2 | 7/2002 | Ehrlich | |
| 6,537,413 B1 | 3/2003 | Hochet et al. | |
| 6,546,694 B2 | 4/2003 | Clifford | |
| 6,635,202 B1 | 10/2003 | Bugg et al. | |
| 6,638,636 B2 | 10/2003 | Tucker | |
| 6,680,017 B1 | 1/2004 | Koch et al. | |
| RE38,508 E | 4/2004 | Wright | |
| 6,824,851 B1 | 11/2004 | Locher et al. | |
| 6,843,525 B2 | 1/2005 | Preisler | |
| 6,852,386 B2 | 2/2005 | Nadezhdin et al. | |
| 6,866,492 B2 | 3/2005 | Hauber et al. | |
| 6,986,546 B2 | 1/2006 | Ehrlich | |
| 7,014,253 B2 | 3/2006 | Oren | |
| 7,017,981 B2 | 3/2006 | Strohmavr et al. | |
| 7,056,567 B2 | 6/2006 | ONeill et al. | |
| 7,069,702 B2 | 7/2006 | Ehrlich | |
| 7,128,365 B2 | 10/2006 | Kiesewetter et al. | |
| 7,155,797 B2 | 1/2007 | Kim | |
| 7,255,822 B2 | 8/2007 | Bledsoe et al. | |
| 7,338,696 B2 | 3/2008 | Rambaud et al. | |
| 7,540,932 B2 | 6/2009 | Rub et al. | |
| 7,553,435 B2 | 6/2009 | McCollum | |
| 7,722,112 B2 | 5/2010 | Ehrlich | |
| 7,722,122 B2 | 5/2010 | Mittelstadt | |
| 7,758,487 B2 | 7/2010 | Elsayed et al. | |
| 7,785,518 B2 | 8/2010 | Wirt et al. | |
| 7,814,658 B2 | 10/2010 | Akishev et al. | |
| 7,842,147 B2 | 11/2010 | Shen et al. | |
| 8,087,494 B2 | 1/2012 | Palumbo et al. | |
| 8,273,208 B2 | 9/2012 | Brinner | |
| 8,336,933 B2 | 12/2012 | Nagwanshi et al. | |
| 8,474,583 B2 | 7/2013 | Nagwanshi et al. | |
| 8,524,351 B2 | 9/2013 | Ross | |
| 8,584,433 B2 | 11/2013 | Masuda | |
| 8,663,523 B2 | 3/2014 | Bradford et al. | |
| 8,690,233 B2 | 4/2014 | Preisler et al. | |
| 8,726,613 B2 | 5/2014 | Rhee et al. | |
| 8,764,089 B2 | 7/2014 | Preisler et al. | |
| 8,770,344 B2 | 7/2014 | Borroni | |
| 8,795,465 B2 | 8/2014 | Preisler et al. | |
| 8,795,807 B2 | 8/2014 | Preisler et al. | |
| 8,808,827 B2 | 8/2014 | Preisler et al. | |
| 8,808,828 B2 | 8/2014 | Preisler et al. | |
| 8,808,829 B2 | 8/2014 | Preisler et al. | |
| 8,808,830 B2 | 8/2014 | Preisler et al. | |
| 8,808,831 B2 | 8/2014 | Preisler et al. | |
| 8,808,833 B2 | 8/2014 | Preisler et al. | |
| 8,808,834 B2 | 8/2014 | Preisler et al. | |
| 8,808,835 B2 | 8/2014 | Preisler et al. | |
| 8,834,985 B2 | 9/2014 | Preisler et al. | |
| 8,845,947 B2 | 9/2014 | Wirt et al. | |
| 8,852,711 B2 | 10/2014 | Preisler et al. | |
| 8,859,074 B2 | 10/2014 | Preisler et al. | |
| 8,883,285 B2 | 11/2014 | Preisler et al. | |
| 8,945,327 B2 | 2/2015 | Stamp et al. | |
| 8,995,138 B2 | 3/2015 | Preisler et al. | |
| 9,010,834 B2 | 4/2015 | Preisler et al. | |
| 9,126,537 B2 | 9/2015 | Preisler et al. | |
| 9,283,895 B2 | 3/2016 | Sumi et al. | |
| 9,308,945 B2 | 4/2016 | Preisler et al. | |
| RE45,991 E | 5/2016 | Preisler et al. | |
| 9,346,375 B2 | 5/2016 | Preisler et al. | |
| 9,550,336 B2 | 1/2017 | Bradford | |
| 9,908,315 B2 | 3/2018 | Speer | |
| 10,239,566 B2 | 3/2019 | Bauer et al. | |
| 2001/0011832 A1 | 8/2001 | Ehrlich et al. | |
| 2002/0014302 A1 | 2/2002 | Fanucci et al. | |
| 2002/0098341 A1 | 7/2002 | Schiffer et al. | |
| 2002/0109377 A1 | 8/2002 | Ehrlich | |
| 2002/0176960 A1 | 11/2002 | Nadezhdin et al. | |
| 2003/0186029 A1 | 10/2003 | Ogawa et al. | |
| 2004/0055248 A1 | 3/2004 | Grillos | |
| 2004/0217631 A1 | 11/2004 | Ehrlich | |
| 2005/0087899 A1 | 4/2005 | Coon et al. | |
| 2005/0123720 A1 | 6/2005 | Suzuki et al. | |
| 2005/0204561 A1 | 9/2005 | Kim | |
| 2005/0225118 A1 | 10/2005 | Oren | |
| 2005/0257893 A1 | 11/2005 | Rub et al. | |
| 2006/0028050 A1 | 2/2006 | Ehrlich | |
| 2006/0241542 A1 | 10/2006 | Gudnason et al. | |
| 2007/0004813 A1 | 1/2007 | Shelby et al. | |

(56) References Cited

U.S. PATENT DOCUMENTS

| | | |
|---|---|---|
| 2007/0056687 A1 | 3/2007 | Brinner |
| 2007/0196681 A1 | 8/2007 | Biggs et al. |
| 2007/0256379 A1 | 11/2007 | Edwards |
| 2008/0111393 A1 | 5/2008 | Ehrlich |
| 2008/0116718 A1 | 5/2008 | Lewallen et al. |
| 2009/0202785 A1 | 8/2009 | Meyer Zu Drewer et al. |
| 2009/0206631 A1 | 8/2009 | Lewallen et al. |
| 2009/0297763 A1* | 12/2009 | Ross ............... B32B 3/263 428/116 |
| 2009/0324905 A1 | 12/2009 | Welch et al. |
| 2010/0227087 A1 | 9/2010 | Naldi |
| 2011/0089183 A1 | 4/2011 | Gundelsheimer |
| 2011/0095574 A1 | 4/2011 | Brown |
| 2011/0135862 A1* | 6/2011 | Sumi ............... B32B 5/18 428/36.91 |
| 2011/0250384 A1 | 10/2011 | Sumi et al. |
| 2012/0040135 A1 | 2/2012 | Werthen et al. |
| 2014/0044914 A1 | 2/2014 | Kurtz et al. |
| 2014/0127452 A1 | 5/2014 | Dietz et al. |
| 2014/0178636 A1 | 6/2014 | Wu et al. |
| 2014/0345795 A1 | 11/2014 | Speer |
| 2014/0349077 A1 | 11/2014 | Sumi et al. |
| 2015/0130220 A1 | 5/2015 | Preisler et al. |
| 2015/0130221 A1 | 5/2015 | Preisler et al. |
| 2015/0132532 A1 | 5/2015 | Preisler et al. |
| 2015/0145276 A1 | 5/2015 | Preisler et al. |
| 2015/0273810 A1 | 10/2015 | Carretta |
| 2015/0306840 A1 | 10/2015 | Ferguson, Jr. |
| 2016/0176149 A1 | 6/2016 | Manderfeld et al. |

FOREIGN PATENT DOCUMENTS

| | | |
|---|---|---|
| JP | H0387461 A | 4/1991 |
| JP | 2003285397 A | 10/2003 |
| JP | 2005238622 A | 9/2005 |
| WO | 9014943 A1 | 12/1990 |
| WO | 9300845 A1 | 1/1993 |
| WO | 0024559 A1 | 5/2000 |
| WO | 0244493 A1 | 6/2002 |
| WO | 2005077654 A1 | 8/2005 |
| WO | 2006128632 A1 | 12/2006 |
| WO | 2008141688 A2 | 11/2008 |
| WO | 2010050242 A1 | 5/2010 |
| WO | 2010069994 A2 | 6/2010 |

OTHER PUBLICATIONS

Non-Final Rejection dated Oct. 1, 2013, for U.S. Appl. No. 13/204,762, 18 pages; obtained from USPTO records, now U.S. Pat. No. 9,908,315.

Final Rejection dated Apr. 9, 2014, for U.S. Appl. No. 13/204,762, 17 pages; obtained from USPTO records, now U.S. Pat. No. 9,908,315.

International Search Report and Written Opinion issued in corresponding PCT/US2018/018151 dated Apr. 5, 2018, 6 pages.

International Search Report and Written Opinion issued in corresponding PCT/US2018/015984 dated Apr. 19, 2018, 7 pages.

* cited by examiner

HYBRID COMPOSITE PANEL AND METHOD

CROSS-REFERENCE TO RELATED APPLICATIONS

This application is a U.S. National Stage of PCT Application No. PCT/US2018/018151 filed on Feb. 14, 2018 which claims priority under 35 U.S.C. § 119 to U.S. Provisional Patent Application No. 62/458,682 filed on Feb. 14, 2017, the entire contents of which are incorporated herein by reference.

BACKGROUND

Many storage trailers, including those for commercial trucking, consist of sidewalls and doors constructed from composite materials. Composite materials may have a plastic core disposed between two outer metal sheets. For example, Wabash National Corporation of Lafayette, Ind. makes DURAPLATE® composite panels that have a high-density polyethylene plastic core (HDPE) fastened between two high-strength, high-tension steel plates.

Cores of composite panels may be constructed from a plurality of structures including a network of cells. One such network of cells is made from an arrangement of hexagons that produce a honeycomb structure with alternating geometric structures and air pockets. In some instances, partially hollow cores (e.g., honeycomb) use less plastic than completely solid composite cores, cutting down on material costs. Additionally, the partially hollow cores weigh less than completely solid cores and have higher density to strength ratios. However, some partially hollow, honeycomb cores may lack the strength required for mechanical fastening used in many commercial applications.

SUMMARY

In some embodiments, a method of producing a composite core member along a production line is provided. In particular embodiments, the core member is used within a composite panel of a tractor trailer. The method comprises providing a partially hollow structure, cutting the partially hollow structure into a plurality of discrete sections with spaces therebetween, providing a plurality of reinforced plastic bands with at least one gap therebetween, aligning the partially hollow structure within the at least one gap, and securing the reinforced plastic bands to the partially hollow structure to produce a composite core member.

The partially hollow structure may comprise a honeycomb cell network including a plurality of hexagonal cells. Further, the step of providing the partially hollow structure may further include the steps of vacuum forming a thermoplastic sheet of material into a plurality of pairs of shapes on a production line and providing the thermoplastic sheet of material with shapes onto a conveyor belt. In some embodiments, the conveyor belt may operate at a lower speed than a speed of the production line to cause the pairs of shapes to bunch up and form the partially hollow structure. In addition, the step of cutting the partially hollow structure into the discrete sections with spaces therebetween may comprise a saw.

In further embodiments, the method further comprises a step of increasing a width of the spaces to a predetermined width using a comb-like device. In particular, the comb-like device may guide the discrete sections apart to increase the width of the spaces.

The method may also comprise a step of laminating the composite core member. Further, the method may comprise a step of cutting the composite core member to a predetermined length and a predetermined width. In some embodiments, the predetermined length may be between about 2 meters to about 4 meters and the predetermined width may be between about 0.75 meters to about 2 meters.

In other embodiments, the method may include a step of fastening a first sheet to a front face of the composite core member and fastening a second sheet to a rear face of the composite core member.

In particular embodiments, the step of providing a partially hollow structure may be performed on a first production line and the step of providing a plurality of reinforced plastic bands with gaps therebetween may be performed on a second production line separate from the first production line.

The method may further comprise a step of guiding the partially hollow structure toward the reinforced plastic bands and the step of providing a plurality of reinforced plastic bands may comprise of extruding the reinforced plastic bands. Further, the reinforced plastic bands may be extruded with the gaps therebetween.

In some embodiments, the step of providing a plurality of reinforced plastic bands may comprise a rotary cutter including a plurality of protrusions. The step of securing the plurality of reinforced plastic bands and the partially hollow structure together may also comprise thermally welding the reinforced plastic bands to the partially hollow structure. The step of providing a plurality of reinforced plastic bands with the at least one gap therebetween may comprise a step of providing at least one interior band and at least one exterior band.

In further embodiments, a width of the at least one interior band may be less than a width of the exterior band.

In some embodiments, the step of aligning the partially hollow structure within the gaps comprises a step of positioning the at least one interior band within the partially hollow structure and positioning the at least one exterior band adjacent an edge of the partially hollow structure.

In another aspect, a composite panel configured for a use in a sidewall and a door of a tractor trailer is provided. The composite panel includes an outer sheet, an inner sheet, and a core member positioned between the inner sheet and the outer sheet. Further, the core member includes a partially hollow structure and a plurality of reinforced strips, and the plurality of reinforced strips extend longitudinally at least through the core member to divide the core into at least two segments.

In further embodiments, the outer sheet and the inner sheet comprise a material selected from the group consisting of a metal, a fibre-reinforced plastic, and a glass reinforced plastic. In addition, the partially hollow structure may be provided as a honeycomb cell network comprising a plurality of hexagonal cells.

In some embodiments, the reinforced strips comprise at least one interior band and at least one external band. The at least one interior band may be positioned within the partially hollow structure and the at least one external band may be positioned around a perimeter of the partially hollow structure. Further, the at least one external band may have a predetermined width of about 4 centimeters to about 8 centimeters and the at least one interior band may have a predetermined width of about 4 centimeters to about 8 centimeters. In addition, the at least one interior band and the at least one external band of the reinforced strips may have the same composition.

In particular embodiments, the partially hollow structure comprises over about 60% of a volume of the core member. The partially hollow structure may comprise a material selected from the group consisting of high density polyethylene, high density polypropylene, low density polyethylene, polyethylene terephthalate, polypropylene, and combinations thereof. Further, the reinforced strips may comprise a material selected from the group consisting of high density polyethylene, high density polypropylene, low density polyethylene, polyethylene terephthalate, polypropylene, and combinations thereof.

The composite panel may have a length dimension ranging between about 2.5 meters to about 3.5 meters and the composite panel may have a width dimension ranging between about 1 meter to about 2 meters.

In some embodiments, the partially hollow structure and the reinforced strips comprise the same composition, but a different volumetric mass density.

Further, the outer sheet and the inner sheet may be bonded to the core member using an adhesive. In particular embodiments, the adhesive may be a modified polyethylene. The partially hollow structure may also be thermally welded to the reinforced strips.

In some embodiments, a width of the segments of the core member are approximately equal. In particular embodiments, the width of the segments may, independently, be in a range between about 10 centimeters to about 50 centimeters.

Further embodiments provide a core for a use in a composite panel. The core comprises a first material provided in a form of a partially hollow structure and a second material provided in a form of a plurality of reinforced strips. At least one of the reinforced strips extends longitudinally though the partially hollow structure to divide the partially hollow structure into at least two segments.

In some embodiments, the partially hollow structure is provided as a honeycomb cell network comprising a plurality of hexagonal cells. The reinforced strips may also comprise at least one interior band and at least one external band. The at least one interior band may be positioned within the partially hollow structure and may divide the partially hollow structure into the at least two segments. Further, the at least one external band may be positioned around a perimeter of the partially hollow structure. In additional embodiments, the at least one external band has a predetermined width of about 4 centimeters to about 8 centimeters and the at least one interior band has a predetermined width of about 4 centimeters to about 8 centimeters. The at least one interior band and the at least one external band may also extend a length of the core.

In some embodiments, the at least one interior band and the at least one external band of the reinforced strips have the same composition. In particular embodiments, a width of the at least one interior band is less than a width of the at least one external band. Further, the partially hollow structure may comprise over about 60% of a volume of the core.

The partially hollow structure may comprise a material selected from the group consisting of high density polyethylene, high density polypropylene, low density polyethylene, polyethylene terephthalate, polypropylene, and combinations thereof. The reinforced strips may comprise a material selected from the group consisting of high density polyethylene, high density polypropylene, low density polyethylene, polyethylene terephthalate, polypropylene, and combinations thereof.

In some embodiments, the core may have a length dimension ranging between about 2.5 meters to about 3.5 meters.

Further, the core may have a width dimension ranging between about 1 meter to about 2 meters.

In particular embodiments, the partially hollow structure and the reinforced strips comprise the same composition, but a different volumetric mass density. The partially hollow structure may also be thermally welded to the reinforced strips. In other embodiments, the partially hollow structure and the reinforced strips may be in a snap engagement.

In further embodiments, a width of the segments are approximately equal. However, the width of the segments may, independently, be in a range between about 10 centimeters to about 50 centimeters.

In another aspect, a method of producing a composite core member along a production line is provided. In this embodiment, the method comprises of providing a partially hollow structure, providing a plurality of reinforced plastic bands with at least one gap therebetween, positioning the plurality of reinforced plastic bands above the partially hollow structure, and pressing the reinforced plastic bands to compress a portion of the partially hollow structure and to insert the reinforced plastic bands into the partially hollow structure. In further embodiments, the method also comprises of securing the reinforced plastic bands to the partially hollow structure to produce a composite core member.

In some embodiments, a method of producing a composite core member along a production line is provided. The method may also comprise of providing a partially hollow structure, cutting the partially hollow structure into a plurality of strips with one or more spaces therebetween, and providing a plurality of reinforced plastic bands with at least one gap therebetween. Further, the method may also include positioning the plurality of reinforced plastic bands above the spaces of the partially hollow structure and pressing the reinforced plastic bands to compress a portion of the partially hollow structure and to insert the reinforce plastic bands into the partially hollow structure. In further embodiments, the method may also comprise of securing the reinforced plastic bands to the partially hollow structure to produce a composite core member.

DETAILED DESCRIPTION

Figure 1:
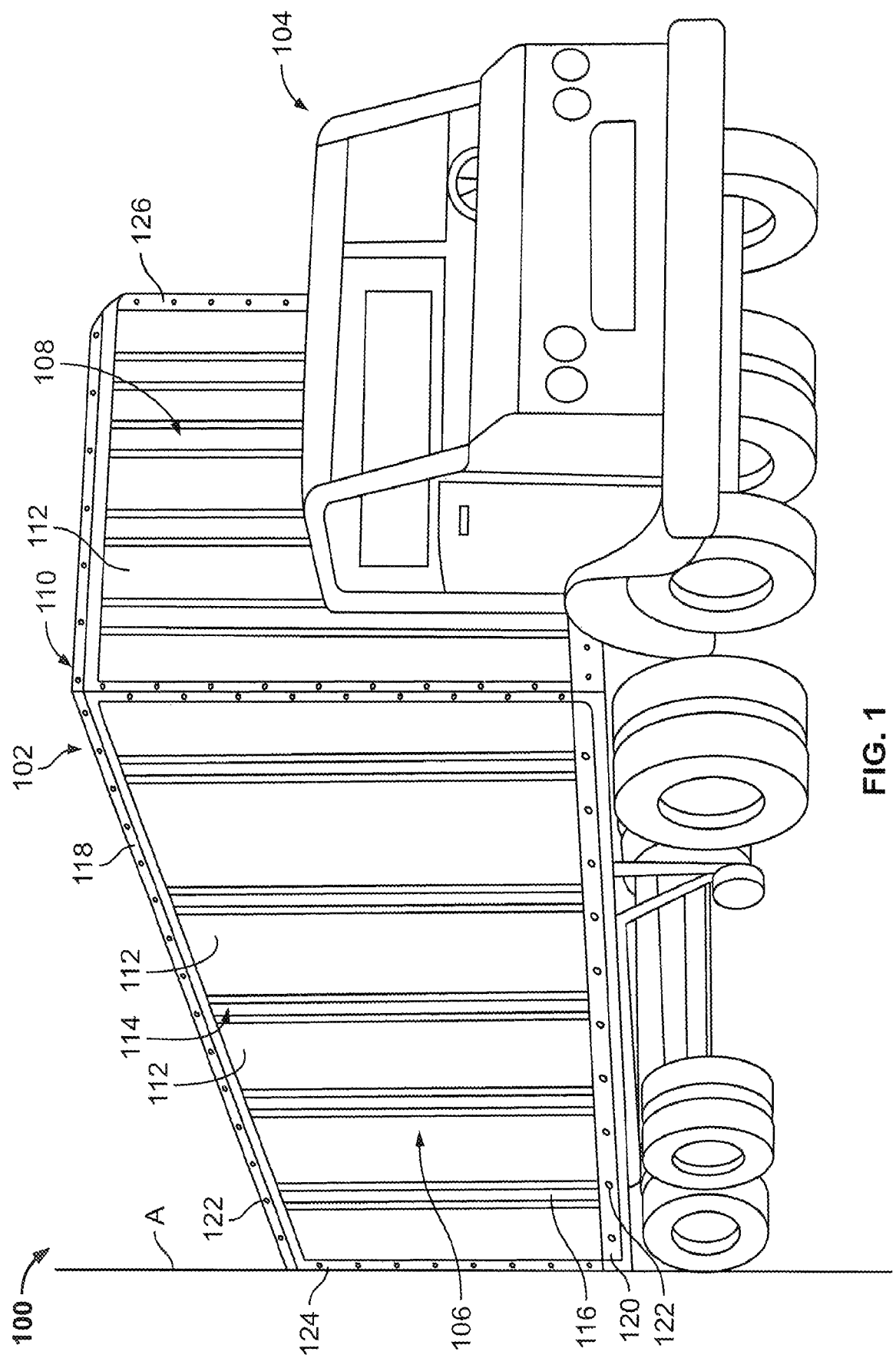
FIG. 1 is a perspective view of a commercial tractor trailer having sidewalls that include a plurality of composite panels.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 depicts a tractor trailer assembly 100 including a trailer 102 designed to carry cargo and a tractor 104 having an engine and a cab section. The trailer 102 may be substantially rectangular and may be defined by one or more sidewalls 106, a front end wall assembly 108, a roof assembly 110, and a rear end wall assembly (not shown), which may include an overhead door. Further, the trailer 102 may be defined by a floor assembly (not depicted) disposed opposite the roof assembly 110. Alternatively, the rear end wall assembly may include two doors mounted in a conventional manner such that the doors are hingedly coupled to and swing between an open position and a closed position. Further, the trailer 102 may be releasably coupled to the tractor 104 by conventional means, such as a fifth wheel, for example.

Portions of each sidewall 106, the front end wall assembly 108, the roof assembly 110, the floor assembly, and/or the rear end wall assembly of the trailer 102 may be made from one or more composite panels 112. The composite panels 112 may be coupled to each other using a number of different fasteners and/or joint configurations. In one embodiment, the composite panels 112 may be coupled to each other via joint configurations 114 including a logistics plate (not shown) and/or a splicing plate 116. In some embodiments, the composite panels 112 may be coupled together along a vertical axis A using rivets, screws, welding adhesives or the like.

Additionally, as shown in FIG. 1, the composite panels 112 may be coupled to a top rail 118 and a bottom rail 120 using a plurality of fasteners 122, e.g., rivets, screws, adhesives, or the like. One or more composite panels 112 may also be coupled to one or more vertically oriented rails 124, 126 that are aligned with and substantially parallel to the vertical axis A of the trailer 102 using a fastener 122, e.g., a rivet. The vertical rails 124, 126 may be disposed between the panels 112 at various points along the length of the trailer 102. Other joint configurations and other fasteners, for example, screws, bolts, nails, welding adhesives, and the like, may also be used to couple adjacent composite panels 112 together, composite panels 112 to the top rail 118 and/or the bottom rails 120, and/or the composite panels 112 to the vertical rails 124, 126.

Figure 2:
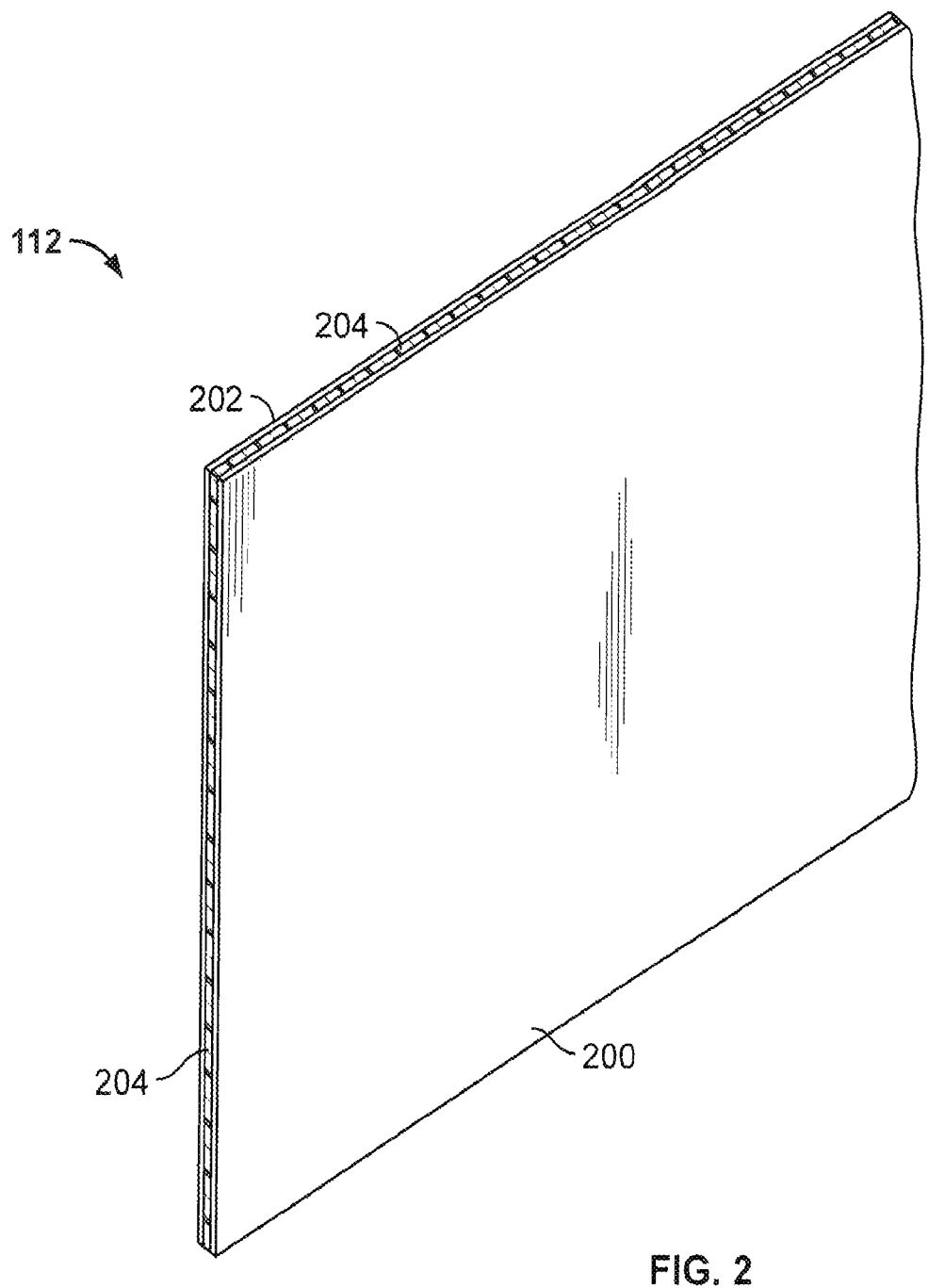
FIG. 2 is an isometric view of a portion of one of the composite panels of FIG. 1 having two outer sheets and a core member.

FIG. 2 depicts a portion of one composite panel 112 that is provided in the form of an inner sheet 200, an outer sheet 202 positioned opposite of the inner sheet 200, and a core member 204 positioned between the inner sheet 200 and the outer sheet 202. The inner sheet 200 and the outer sheet 202, independently, may be formed from high-strength, high-tension steel plates, aluminum, other metals, and/or other alloys. In further embodiments, the inner sheet 200 and the outer sheet 202, independently, may be formed from a reinforced plastic or polymer, such as a fibre-reinforced plastic and/or a glass-reinforced plastic. The inner sheet 200 and outer sheet 202 may also be formed from other materials including, for example, bioplastics, wood, thermoplastic, polymers, and other materials. Further, the core member 204 may be provided in the form of a thermoplastic material that will be described in more detail below.

The inner sheet 200 and the outer sheet 202 may be bonded to the core member 204 by a suitable adhesive layer (not shown). In one embodiment, the inner sheet 200 and the outer sheet 202 are bonded to the core member 204 by a suitable flexible adhesive bonding film such as, for example, modified polyethylene. It may be understood that other suitable adhesives or joining mechanisms may also be used as well. When fully assembled, the outer sheets 202 of each panel 112 cooperate to form an exterior surface of the sidewalls 106, the front end wall assembly 108, and/or the rear end wall assembly (not shown) of the trailer 102, while the inner sheets 200 of each panel 112 cooperate to form an interior surface of the sidewalls 106, the front end wall assembly 108, and/or the rear end wall assembly (not shown) of the trailer 102.

Figure 3:
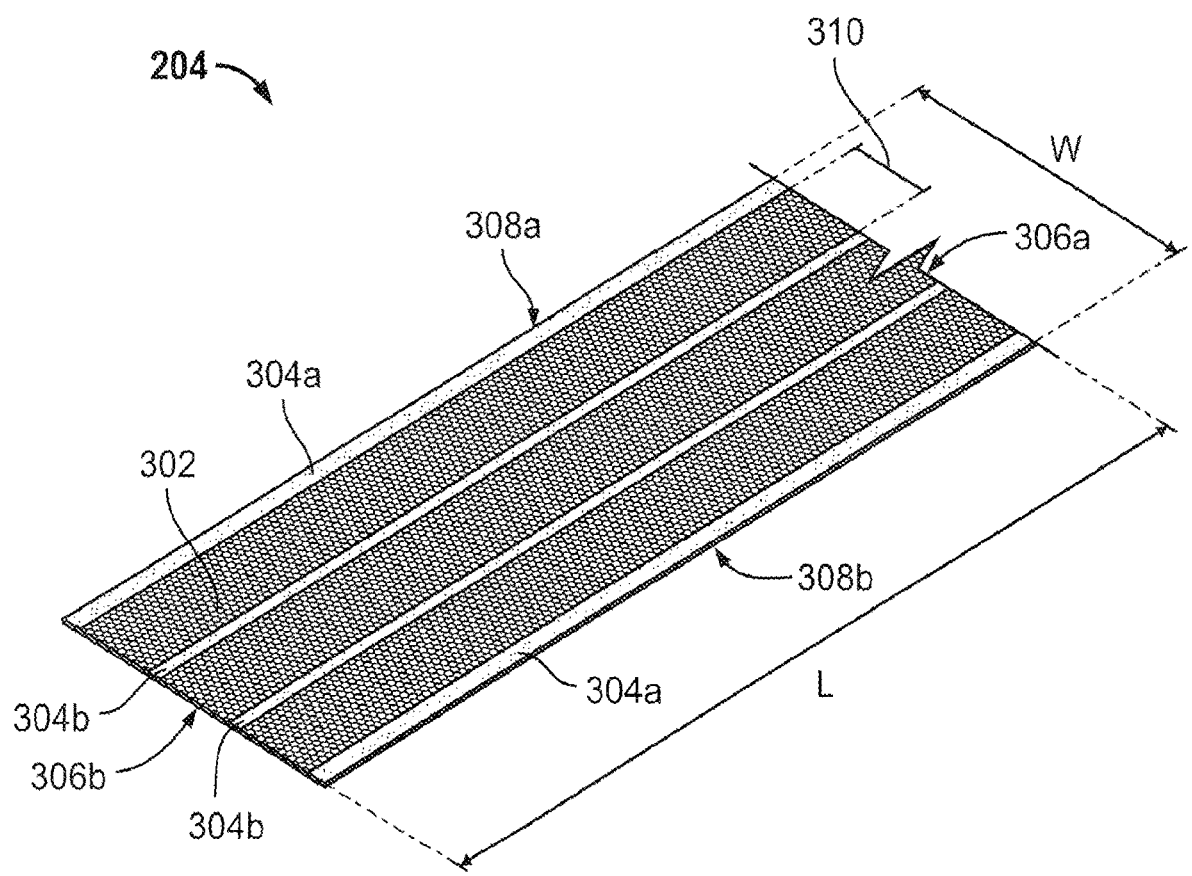
FIG. 3 is an isometric view of the core member of the panel of FIG. 2 with various sections including honeycomb structure and reinforced bands.

FIG. 3 depicts the core member 204 of a single composite panel 112, which may be substantially rectangular and generally corresponds to a shape and a size of each of the inner and outer metal sheets 200, 202. The core member 204 may be defined by a first end 306a and a second end 306b disposed at opposite ends of the core member 204, and a first lateral edge 308a and a second lateral edge 308b, on opposing sides of the core member 204. Illustratively, the distance between the first and second ends 306a, 306b may define a length dimension L of the core member 204 and the distance between the first and the second lateral edges 308a, 308b may define a width dimension W of the core member 204.

The core member 204 may be provided in a variety of shapes and sizes. With reference to FIG. 3, the length dimension L and the width dimension W of the core member 204 may generally define the size and shape of the core member 204. In some embodiments, the length dimension L may range between about 1 meter to about 16 meters. In particular embodiments, the length dimension L may range from about 2 meters to about 4 meters, or between about 2.5 meters to about 3 meters. Further, in some embodiments, the width dimension W may range between about 0.5 meters to about 4 meters. In particular embodiments, the width dimension W may range between about 0.75 meters to about 2 meters, or between about 1 meter to about 1.5 meters. The core member 204 may also have a predetermined height or thickness. In some embodiments, the core member 204 has a predetermined thickness between about 3 millimeters to about 15 millimeters and, in particular embodiments, the core member 204 may have a predetermined thickness between about 5 millimeters to about 10 millimeters. It should be understood that the length, width, and thickness dimensions of the core member 204 may be modified such that the core member 204 would be suitable in other applications referenced herein.

The core member 204 may also be defined by one or more first structures 302 and one or more second structures 304 (304a, 304b) that are structurally different with respect to each other. More specifically, in some embodiments, the first structure 302 may comprise one or more continuous thermoplastic cell networks or honeycomb structures. In some embodiments, the first structure 302 and/or the honeycomb structures may extend in the length dimension between the first and the second ends 306a, 306b, and, therefore, may extend the entirety of the length dimension L. However, in further embodiments, one or more of the honeycomb structures or first structure 302 may not extend the entirety of the width dimension W, but may terminate adjacent to one or more of the second structures 304, as described in more detail below. Moreover, in the present embodiment shown in FIG. 3, the first structures 302 are depicted as relatively equal in width. In other embodiments, the first structures 302 may independently have a variety of widths.

In some embodiments, the first structure 302 may comprise over about 40%, or over 50%, or over 60%, or over about 75%, or over about 85%, or over 95% of the entire volume of the core member 204. The first structure 302 may be designed to reduce the weight of the core member 204, as compared to a core member 204 having a completely solid core structure, while maintaining desired core strength. Furthermore, the first structure 302 may use less plastic as compared to a solid plastic core material. It should be understood that the first structure 302 may be formed from a honeycomb cell network and/or may be formed from other hollow webbed structures (including, for example, squares, parallelograms, triangles, and the like) and is not be limited to hexagonal honeycomb structures.

The second structure 304 of the core member 204 may be defined by a reinforced material. In some embodiments, the second structure 304 and/or reinforced material may be a solid or a substantially solid plastic material. In this particular embodiment, the core member 204 includes a plurality (e.g., four strips) of solid plastic material bands extending the entirety of the length L of the core member 204. Moreover, in this particular embodiment, the solid plastic material or second structure 304 may include one or more exterior bands 304a and/or one or more interior bands 304b.

In some embodiments, the two exterior bands 304a may have a larger width dimension than the two interior bands 304b. However, in other embodiments, the interior bands 304b may have a larger width dimension than the exterior bands 304a, and/or the interior bands 304b and the exterior bands 304a may have substantially the same width dimensions. In particular, a width dimension of the interior bands 304b and/or the exterior bands 304a may, independently range between about 1 centimeter to about 100 centimeters, or between about 5 centimeter to about 50 centimeters, or between about 10 centimeters to about 25 centimeters. In some embodiments, the interior bands 304a and/or the exterior bands 304a may, independently, range between about 4 centimeters to about 8 centimeters.

Further, the four strips may also be oriented parallel with respect to each other and intermittingly spaced apart from one another. In this particular embodiment, there may be intermitting spaces 310 between the solid plastic material or second structure 304, which may define a width of the honeycomb structures or first structure 302. In this embodiment, the second structure 304 may be provided as four bands of solid plastic material, however, in other embodiments there could be two, three, or any other suitable number, as needed, of solid plastic material bands. In other embodiments, the solid plastic material or second structure 304 may solely consist of exterior bands 304a (i.e., no interior bands 304b) or solely consist of interior bands 304b (i.e., no exterior bands 304a), or some other combination not specifically set forth herein.

As noted above, the intermitting spaces 310 may define a width of the honeycomb structures or first structure 302. In some embodiments, the intermitting spaces 310 may range, independently, between about 0.1 meters to about 2 meters. In particular embodiments, the intermitting spaces 310 may range between about 0.2 meters to about 1 meters, or between about 0.3 meters to about 0.8 meters.

As noted above, the second structure 304 of the core member 204 may be four solid reinforced plastic materials. In some embodiments, the two exterior bands 304a may be welded to the first structure 302 on opposing lateral edges 308a, 308b thereof and/or the two interior bands 304b may be welded between the first structures 302. In other embodiments, the second structure 304 and the first structure 302 may be connected and/or attached using a snap engagement comprising mating connectors, an adhesive, or the like.

The second structure 304 may be designed to be coupled to a portion of the trailer 102 using the fastener 122, e.g., a rivet, a bolt, a screw, etc. The addition of one or more solid reinforced materials or second structures 304 into the core member 204 may significantly increase the strength of the composite panel 112. Additionally, the second structure 304 may increase the fastener pull out strength when compared to composite panels that comprise completely honeycomb material cores. It should be understood that the solid reinforced material or second structure 304 may also be positioned along one or more of the first end 306a, the second end 306b, or any area in or around the honeycomb core or first structure 302 where additional strength is desired.

The first structure 302 and/or the second structure 304 (e.g., a honeycomb structure and a solid reinforced material, respectively) of the core member 204 may be formed from a thermoplastic, preferably high density polyethylene (HDPE) or high density polypropylene. However, the first structure 302 and/or the second structure 304 may be formed from other materials (including, for example, low density polyethylene (LDPE), polyethylene terephthalate (PET), polypropylene (PP), or the like, or combinations of different materials). In one some embodiments, the first structure 302 may be provided as a thermoplastic honeycomb material and the second structure 304 may be provided as a foamed and/or a solid HDPE. Although the materials of the first material and second structure 304 of the core member 204 may comprise the same material, the process and methodology to form the first structure 302 and second structure 304 of the core members 204 may be different with respect to each other and is described in more detail below. As a result, the first structure 302 and the second structure 304 of the core member 204 may be defined by different properties including, for example, density, tensile strength, and the like.

Figure 4:
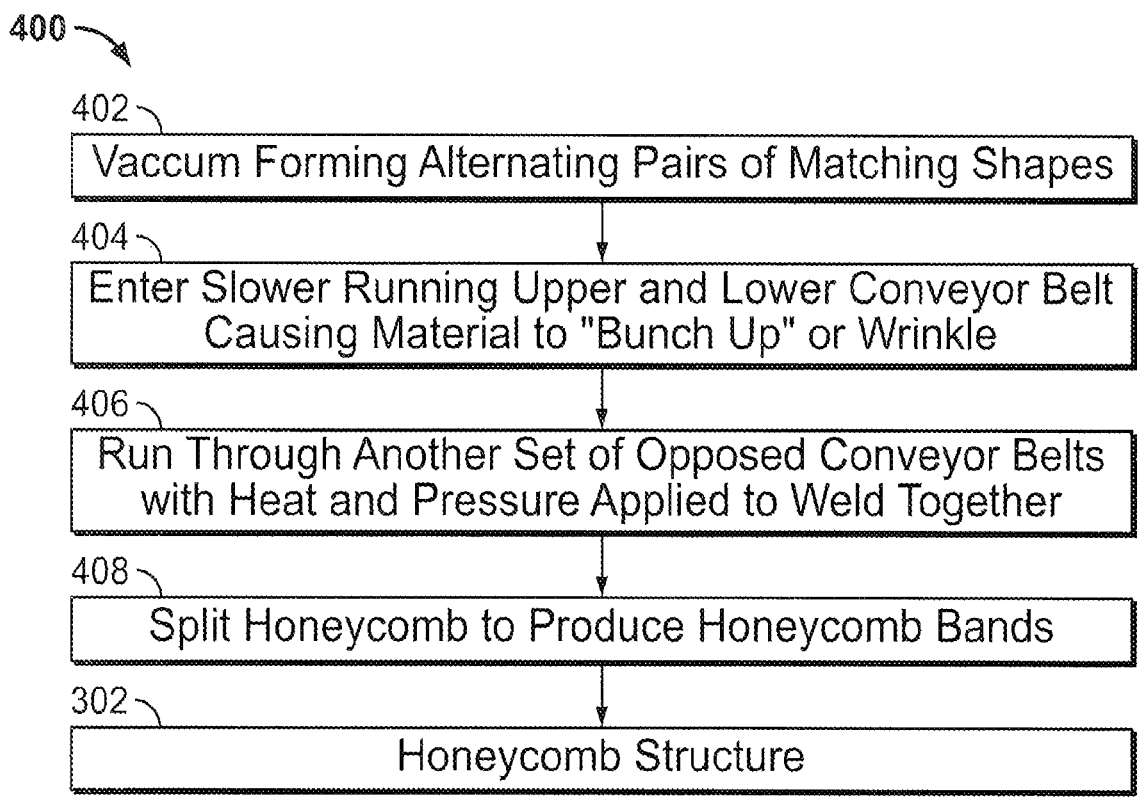
FIG. 4 is a flow chart for an example methodology used to make the honeycomb structure of FIG. 3.
Figure 5:
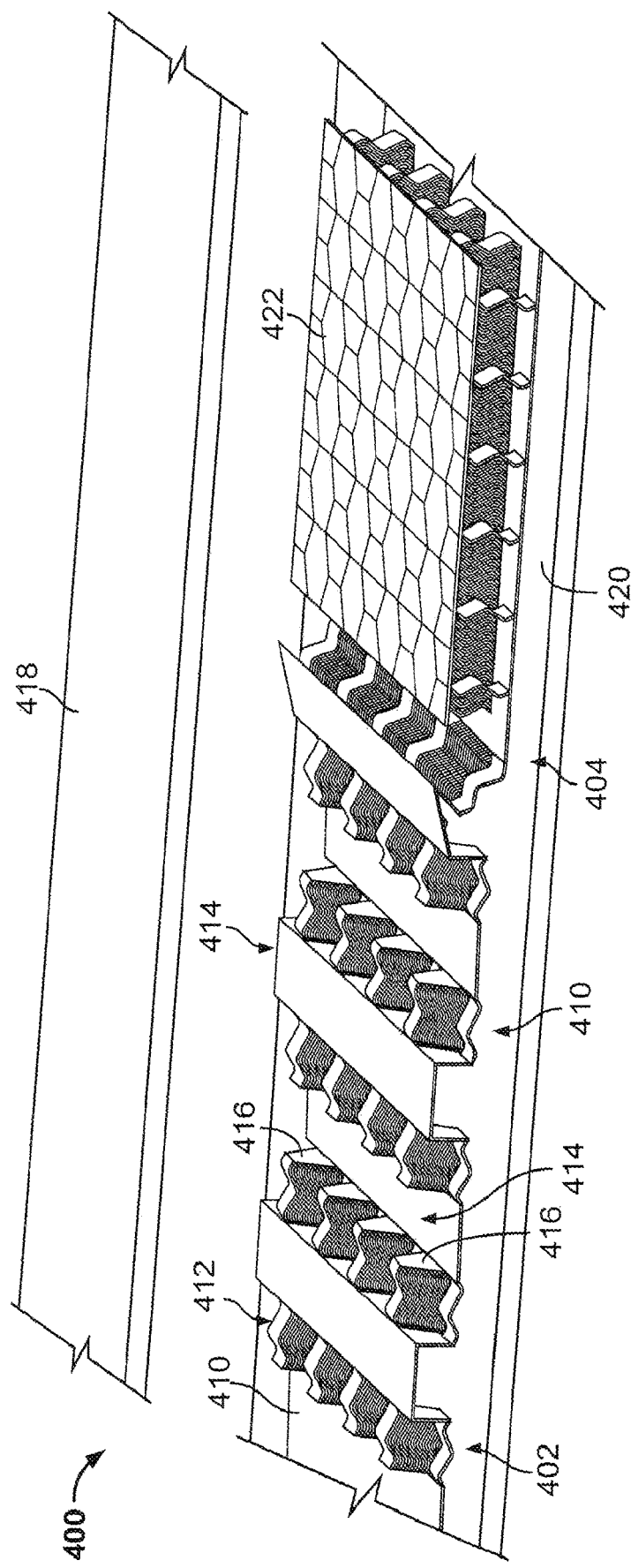
FIG. 5 is an isometric view of a portion of a plurality of panels on a production line undergoing the method of FIG. 4.

FIGS. 4 and 5 depict an illustrative process or method 400 for making the first structure 302 (i.e., the honeycomb structure) of the core member 204. Exemplary processes or methods for making a honeycomb structure are described in detail in International Publication No. WO 2008/141688 A2, the entirety of which is hereby incorporated by reference herein. In general, the process 400 may be schematically illustrated with steps 402, 404, 406, and 408.

In most embodiments, a flat sheet 410 of thin deformable material may be fed to the process 400 as a starting material. For example, the flat sheet 410 may be one of a thermoplastic polymer, a low density polyethylene, a polyethylene terephthalate, a polypropylene, a fiber composite, a plastically deformable paper, a deformable metal sheet, or the like.

Initially, step 402 comprises the step of vacuum forming the thin sheet 408 into alternating pairs of matching shapes. In some embodiments, the sheet 410 may be intermittingly vacuum formed to produce a plurality of deformed regions 412 and a plurality of non-deformed regions 414 positioned therebetween. The deformed regions 412 may be generally three-dimensional and may include one or more individual cells 416 of predetermined shape and size. As will be described in greater detail below, the predetermined shape and size of the cells 416 may determine the structure of the first structure 302 of the core member 204. For example, in the particular embodiment shown in FIG. 5, the cells 416 are substantially trapezoidal to produce, when folded, a honeycomb structure. Alternative embodiments may include a cell with a polygonal structure, a sinusoidal or arcuate shape, a rectangular design, or the like. Further, the walls of the cells 416 may be substantially linear, bowed, curved, etc. to produce the first structure 302 with a desired structure.

In the next step 404, the vacuum formed mating pairs or cells 416 enter onto a conveyor belt. In some embodiments, the conveyor belt includes an upper conveyor belt 418 and a lower conveyor belt 420 that each may run at a speed that is relatively slower than a speed of the incoming material. The slower speed of the lower conveyor belt 420 may cause the incoming vacuum formed mating pairs or cells 416 to bunch up, wrinkle, and/or stand up to produce a plastic network 422, e.g., a plastic honeycomb network. For example, in the embodiment shown in FIG. 5, the material may be formed into alternating pairs of trapezoidal cells that, when folded, form completed hexagonal shapes.

Further, in step 406, the bunched up honeycomb structure or plastic network 422 may enter a second conveyor belt (not shown). In some embodiments, the second conveyor belt may be provided as opposed conveyor belts, i.e., one conveyor positioned above the plastic network 422 and one conveyor positioned below the plastic network 422. Further, the conveyor belts may apply a predetermined amount of heat at a predetermined temperature and/or a predetermined amount of force may be applied at a predetermined pressure to consolidate and/or weld the plastic network 422 together to produce the first structure 302. Additional heat and/or pressure may be applied in step 406 to calibrate the first structure 302 to the desired final thickness and/or the desired final height.

The predetermined temperature applied in step 406 may range between about 40° C. to about 250° C. In some embodiments, the predetermined temperature may range between about 100° C. to about 200° C. or between about 160° C. to about 190° C. Further, the predetermined pressure may range from about 1 MPa to about 100 MPa. In some embodiments, the predetermined pressure may range between about 15 MPa to about 40 MPa, or between about 25 MPa to about 30 MPa. The heat and/or pressure may be applied for a predetermined amount of time in order to consolidate and/or weld the plastic network 422 together. Further, the heat and/or pressure may be applied for a predetermined amount of time in order to calibrate the first structure 302 to a desired thickness.

Figure 8:
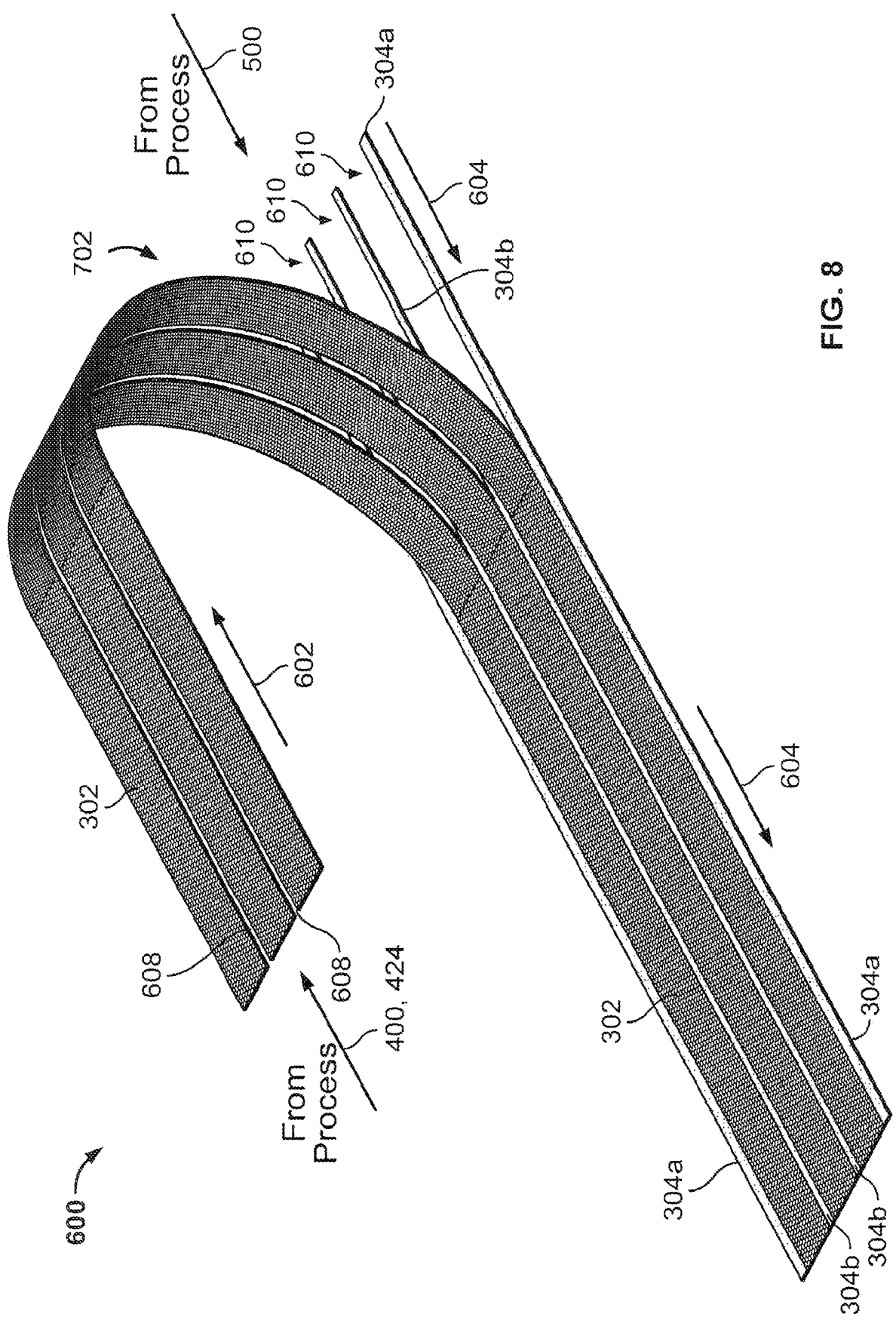
FIG. 8 is an isometric view of a plurality of composite panels on a production line, whereby the honeycomb structure is being joined to the reinforced bands.

In step 408, the first structure 302 may be cut into bands including one or more spaces 608 (see FIG. 8). In this embodiment, the first structure 302 may be cut using saws then guided or steered apart using a comb-like device to a predetermined width to produce the one or more spaces 608. In some embodiments, the first structure 302 may be cut into three bands with the plurality of spaces 608 that are each about 4 cm to about 8 cm. The width of the plurality of spaces 608 may be designed to be cut to a width that corresponds to a width of the second structure 304.

Figure 6:
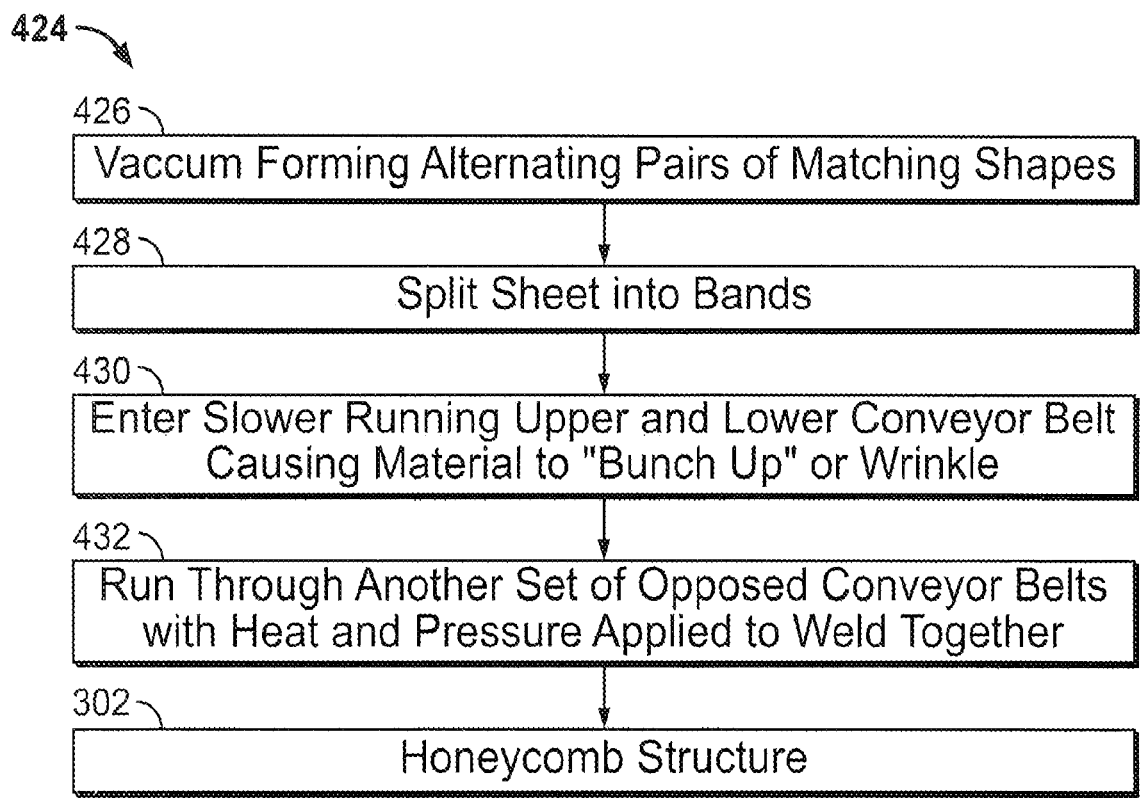
FIG. 6 is a flow chart for an alternative embodiment of an example methodology used to make the honeycomb structure of FIG. 3.

FIG. 6 depicts an alternative process or method 424 for making the first section 302 (e.g., the honeycomb structure) of the core member 204. The process 424 may be schematically illustrated with steps 426, 428, 430, and 432. Initially, similar to step 402, a step 426 may include vacuum forming a thin plastic sheet into alternating pairs of matching shapes. In some embodiments, each shape may be one half of a hexagonal honeycomb cell. In the next step 428, the vacuumed formed sheet may be cut into bands, e.g., three bands, with a plurality of spaces 608 (see FIG. 6). In such embodiments, the sheet may be slit and/or cut using rotary knives and then guided or steered apart using a comb-like device to a predetermined thickness to produce the plurality of spaces 608. Similar to process 400, the sheet may be slit into bands with one or more of the spaces 608 that may each be about 4 cm to about 8 cm. In particular, the width of the spaces 608 may be designed to be cut to a width that corresponds to a width of the second structure 304.

Next, in step 430, the bands, composed of the vacuum formed mating pairs, may enter onto an upper and a lower conveyor belt that are running at slower speeds relative to the incoming material. As such, the slower speed of the upper and the lower conveyor belt may cause the incoming vacuum formed mating pairs to bunch up, wrinkle, and/or stand up to produce a network of cells, e.g., a honeycomb plastic network. In one embodiment, the material may be formed into alternating pairs of hexagonal cells that, when folded, form completed hexagonal shapes.

In step 432, the bunched up honeycomb structure may enter opposed conveyor belts, i.e., one conveyor positioned above the structure and one conveyor positioned below the structure, where heat and/or pressure may be applied to consolidate and/or weld the honeycomb network together to produce the first structure 302. Additional heat and/or pressure may be applied in step 432 to calibrate the honeycomb structure or the first structure 302 to the desired final thickness or height. In particular, the conveyor belts may apply a predetermined amount of heat at a predetermined temperature and/or a predetermined amount of force may be applied at a predetermined pressure to consolidate and/or weld the plastic networks together to produce the first structure 302.

The predetermined temperature applied in step 432 may range between about 40° C. to about 250° C. In some embodiments, the predetermined temperature may range between about 100° C. to about 200° C. or between about 160° C. to about 190° C. Further, the predetermined pressure may range from about 1 MPa to about 100 MPa. In some embodiments, the predetermined pressure may range between about 15 MPa to about 40 MPa, or between about 25 MPa to about 30 MPa. The heat and/or pressure may be applied for a predetermined amount of time in order to consolidate and/or weld the plastic networks together. Further, the heat and/or pressure may be applied for a predetermined amount of time in order to calibrate the first structure 302 to a desired thickness.

Figure 7:
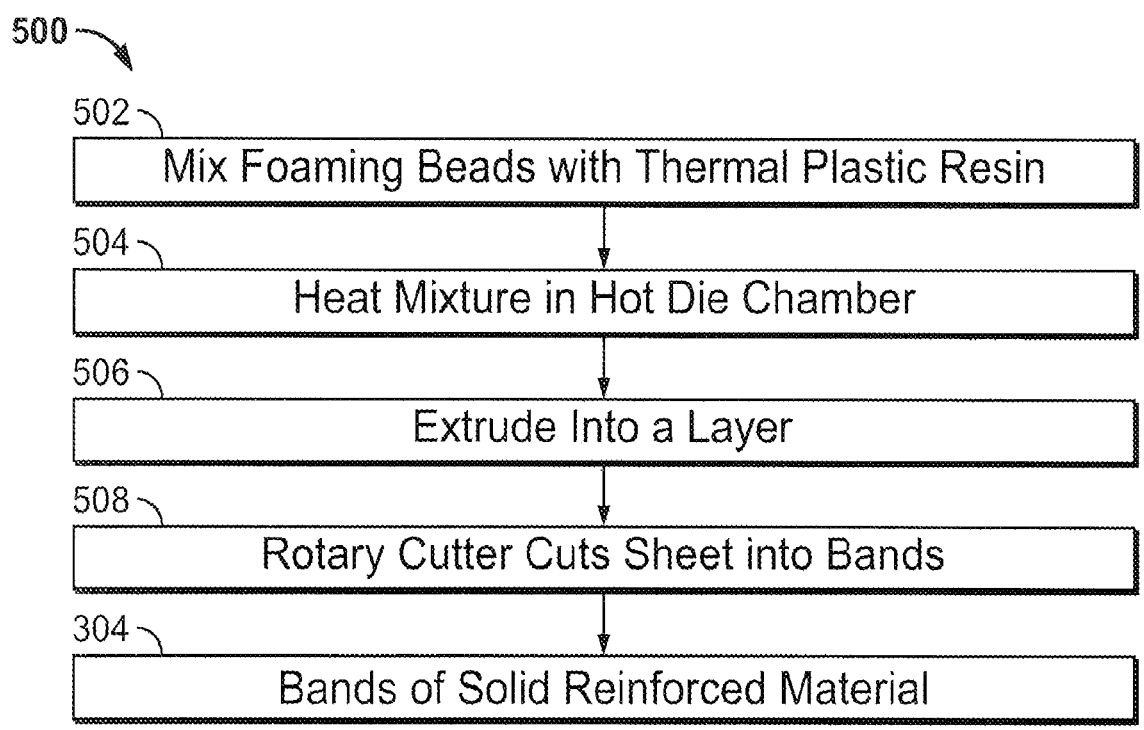
FIG. 7 is a flow chart for an example methodology used to make the reinforced bands of FIG. 3.

FIG. 7 depicts an illustrative process or method 500 for making the second structure 304 of the core member 204 (e.g., the strips of reinforced material). The process 500 may be schematically illustrated with one or more steps 502, 504, 506, and 508. In the illustrated embodiment, the process 500 may produce one or more bands of foamed HDPE that may each be about 4 cm to about 8 cm wide. In some embodiments, the plurality of bands may be produced by an extrusion line similar to the one described in U.S. Patent Application No. 2014/0345795, the entirety of which is hereby incorporated by reference, herein.

In step 502, foaming beads and/or pellets may be mixed with thermoplastic resin beads and/or pellets in a mixing chamber. Next, in step 504, the mixture may enter a hot die chamber and may be exposed to heat, which may activate and produce carbon dioxide and/or nitrogen, which may foam the mixture. The mixture may then be extruded into a layer with a desired thickness using an extruder in step 506. Leaving step 506 may be a continuous sheet of reinforced material or second structure 304. Thereafter, in step 508, a rotary cutter may be used to slice and cut the continuous sheet of the second structure 304 into one or more reinforced plastic bands 304a, 304b. In some embodiments, the rotary cutter may be a cylindrical roller with protrusions extending around the circumference of the roller. As a result, as the cylindrical roller rotates, the protrusions create intermediate gaps of varying widths and the resultant reinforced plastic bands 304a, 304b. In some embodiments, the protrusions have widths approximately equal to the widths of the bands of the first structure 302. Alternatively, in step 508, the continuous sheet of the second structure 304 may be slit using rotary knives, then combed apart to produce the reinforced plastic bands 304a, 304b.

FIG. 8 illustrates an exemplary process of joining the first and second structures 302, 304 and further illustrates the core member 204 provided as a continuous sheet 600 before, during, and after the second structure 304 is inserted into the spaces 608 of the first structure 302 and before the continuous sheet 600 may be sized and/or calibrated.

Figure 9:
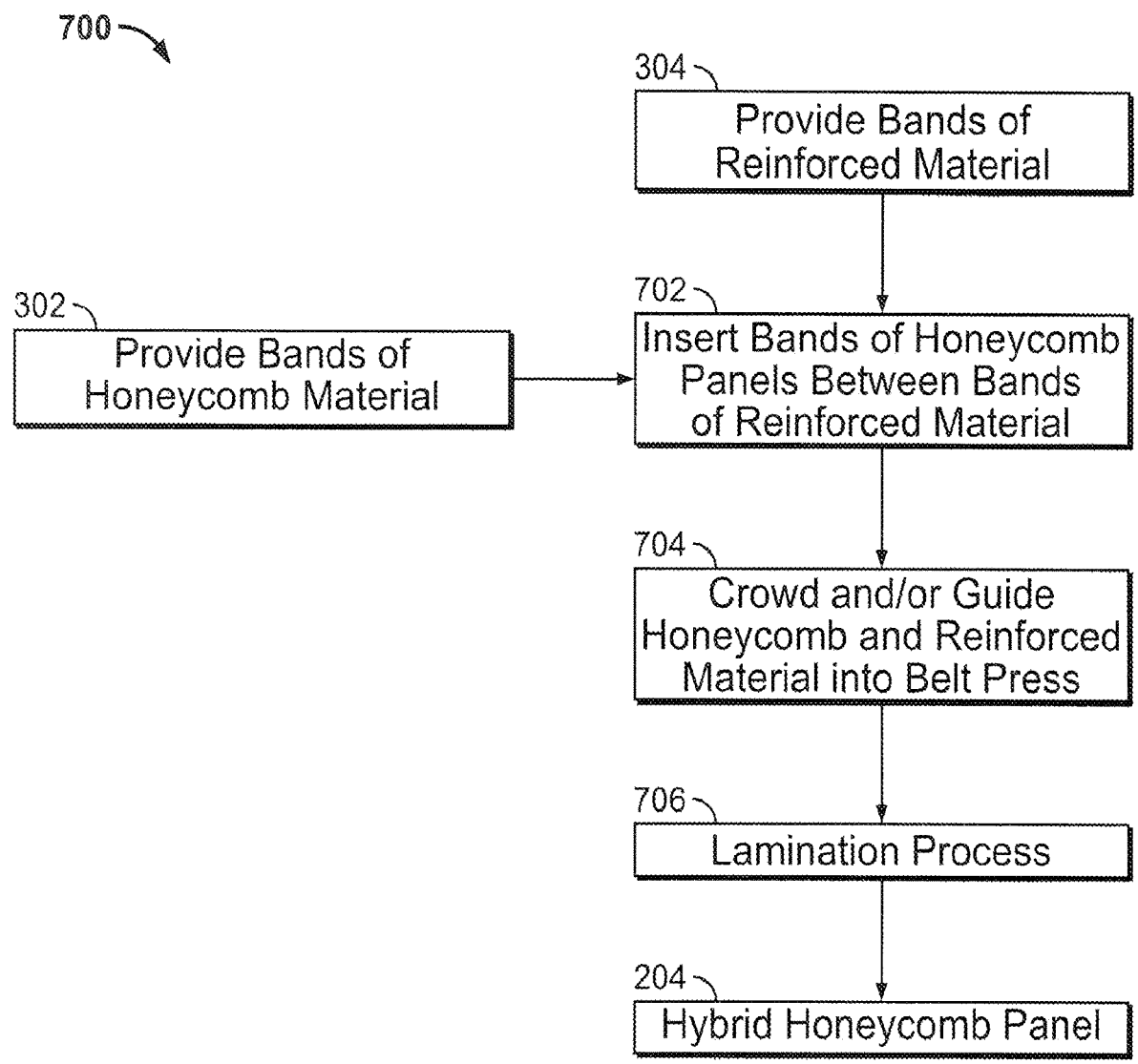
FIG. 9 is a flow chart for an example methodology used to make the core member of FIG. 3.

FIG. 9 depicts an illustrative process or method 700 for making and reinforcing the core member 204. The process 700 may be schematically illustrated with steps 702, 704, and 706. In some embodiments, the first structure 302 may be produced from the process 400 or the process 424, and the second structure 304 may be produced from the process 500. Further, the first structure 302 and the second structure 304 may be the starting materials for the process 700. It should be appreciated that, in some embodiments, the process 400 may be substituted with the process 424. As such, the first structure 302 entering the process 700 may be produced by the process 400 and/or the process 424. With that in mind, it should be understood that any reference to the process 400, hereinafter, may also be substituted with the process 424.

In the embodiment depicted in FIG. 8, a production line for the process 400 may be located above a production line for the process 500. Further, the two production lines (i.e., the production line for process 400 and the production line for process 500) may operate in opposite directions. For example, as best seen in FIG. 8, the process 400 may move in a first direction 602, while the process 500 may move in a second direction 604. Therefore, as the first structure 302 leaves the process 400, the bands of first structure 302 may be inserted within the gaps 610 between the bands of the second structure 304. Moreover, during step 702, the bands of first structure 302 may move to the lower production line from the process 500 and, as a result, the bands of the first structure 302 may move in the second direction 604 as they are being inserted in between the strips of second structure 304.

In some embodiments, the process 400 and/or the process 500 may operate in a similar direction. For example, in one embodiment, a production line for the process 400 may be located above a production line for the process 500. Further, in this embodiment, the production line for the process 400 and the production line for the process 500 may operate in parallel direction and, thus, during the step 702, the bands of the first structure 302 may slope downward and situate within the gaps 610 and between the second structures 304.

Leaving step 702, the bands of the first structure 302 and the solid plastic material strips of the second structure 304 may be crowded and/or guided together to eliminate any undesired gaps between the materials in step 704. Further, the first structure 302 and the second structure 304 may be guided into a belt press to assist in compressing the materials. Next, in step 706, a lamination process may occur, which may act to manufacture the material into multiple layers to increase the strength and stability of the core member 204. Also, in step 706, the core member 204 may be cut and/or sized to the desired length dimension L and width dimension W.

Figure 10:
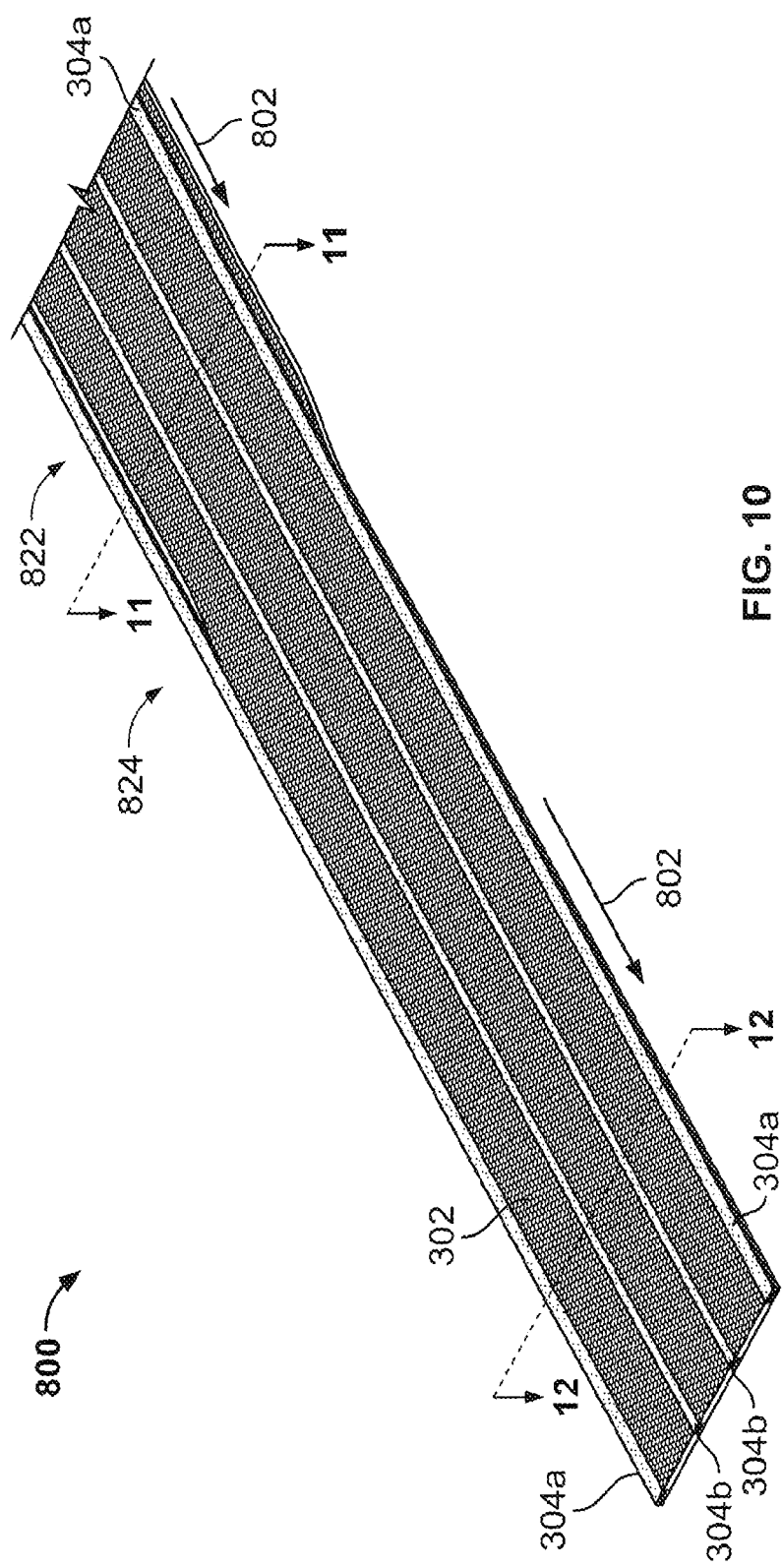
FIG. 10 is an isometric view of a plurality of composite panels on a production line, whereby the honeycomb structure is being joined to the reinforced bands.
Figure 11:
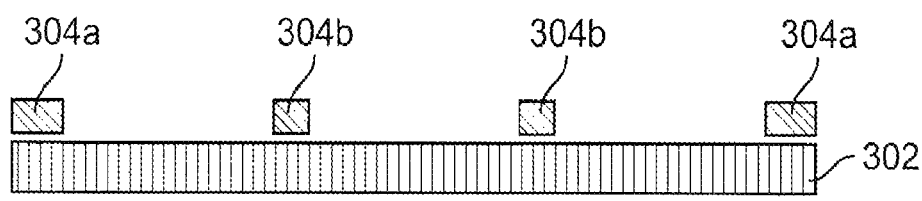
FIG. 11 is a cross-sectional view taken at line 11-11 of FIG. 10.
Figure 12:
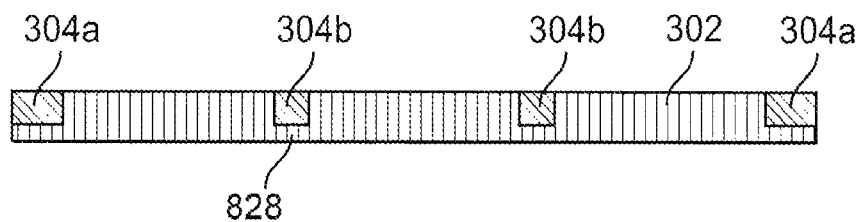
FIG. 12 is a cross-sectional view taken at line 12-12 of FIG. 10.

FIGS. 10-12 illustrate another exemplary process of joining the first structure 302 and the second structure 304 and further illustrates the core member 204 provided as a continuous sheet 800 before, during, and after the second structure 304 is inserted into the first structure 302 and before the continuous sheet 800 may be sized and/or calibrated. In this particular embodiment, the process of joining the first structure 302 and the second structure may operate in a forward direction 802.

Figure 13:
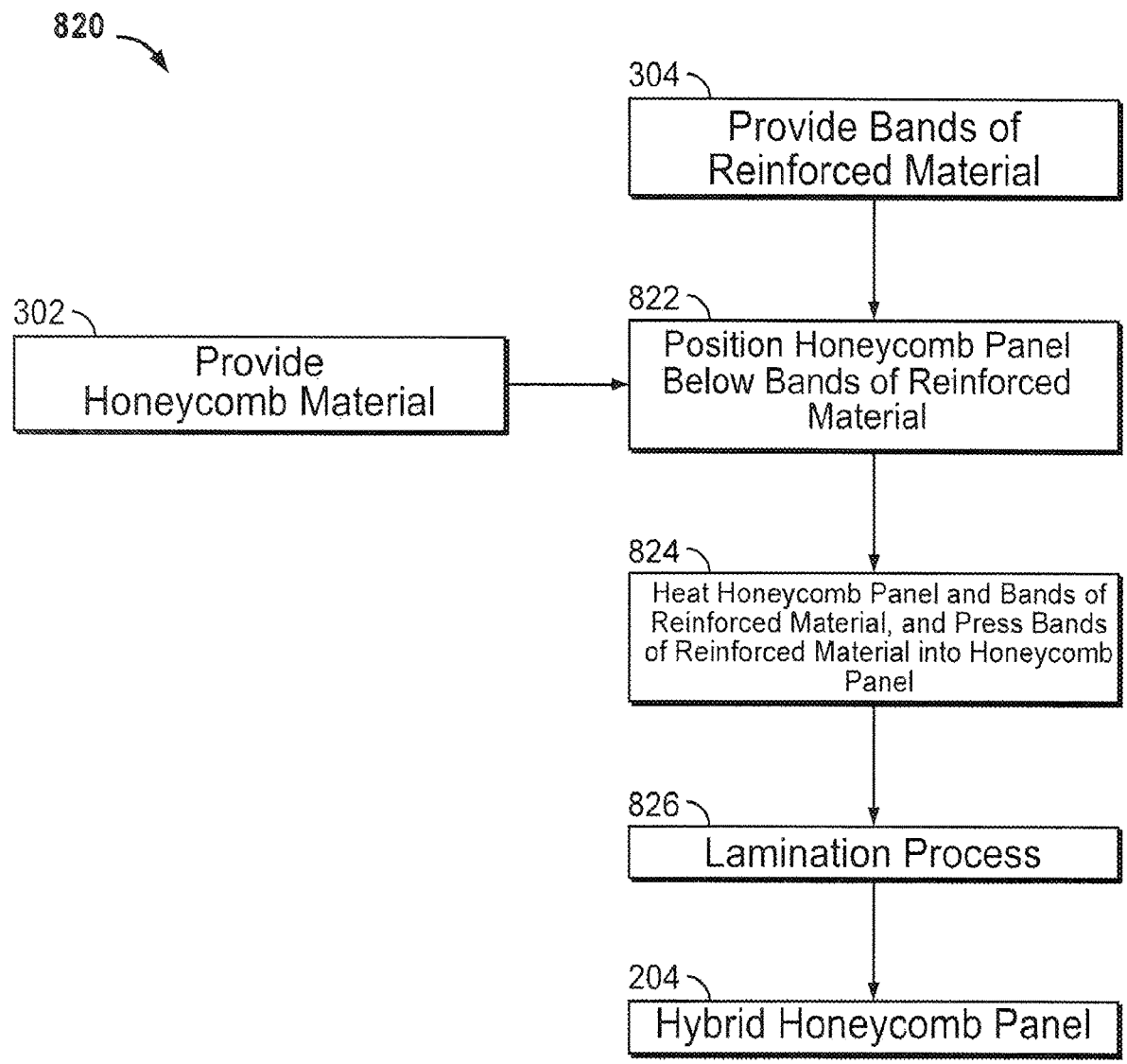
FIG. 13 is a flow chart for an example methodology used to make the core member of FIG. 3.

FIG. 13 depicts an illustrative process or method 820 for making and reinforcing the core member 204, as further illustrated in FIGS. 10-12. The process 820 may be schematically illustrated with steps 822, 824, and 826. In some embodiments, the first structure 302 may be produced from the process 400 or the process 424, and the second structure 304 may be produced from the process 500. However, in the particular embodiment of method 820, the first structure 302 is not split into bands. Rather, the first structure 302 is provided to the process 820 as a continuous first structure 302 (see FIGS. 10 and 11). In particular, a continuous sheet of the first structure 302 and one or more bands of the second structure 304 may be the starting materials for the process 820.

Further, it should be appreciated that, in some embodiments, the process 400 may be substituted with the process 424. As such, the first structure 302 entering the process 820 may be produced by the process 400 and/or the process 424. With that in mind, it should be understood that any reference to the process 400, hereinafter, may also be substituted with the process 424.

In the embodiment depicted in FIGS. 10-12, a production line for the process 500 may be located above a production line for the process 400. Further, the two production lines (i.e., the production line for process 400 and the production line for process 500) may operate in a similar direction. For example, as best seen in FIG. 10, the process 500 may be positioned above the process 400, and the process 400 and the process 500 may move in the forward direction 802. As such, in step 822, the first structure 302 may be positioned below the second structure 304.

Next, in step 824, the first structure 302 and the second structure 304 may be heated. In particular embodiments, the first structure 302 and the second structure 304 may be heated to a predetermined temperature of about 40° C. to about 250° C. In some embodiments, the predetermined temperature may range between about 100° C. to about 200° C. or between about 160° C. to about 190° C.

Further, in step 824, the second structure 304 may be pressed within the first structure 302. In the illustrative embodiment shown in FIG. 10, the first structure 302 may incline upward to meet the second structure 304 using a ramped conveyor belt (not shown).

In other embodiments, the second structure 304 may be positioned on top of the first structure 302 and then pressed within the first structure 302. In particular embodiments, the second structure 304 may be pressed within the first structure 302 using a platen press (not shown) and, in another embodiment, the second structure 304 may be pressed into the first structure 302 using a cylindrical roller (not shown). Further, during step 824, the first structure 302 may be compressed by the second structure 304 to produce a compressed first structure 828 (see FIG. 12). Therefore, after step 824, the second structure 304 may be positioned within the first structure 302. After inserting the second structure 304 into the first structure 302, the core member 204 may be cooled to a predetermined temperature.

Next, in step 826, a lamination process may occur, which may act to manufacture the material into multiple layers to increase the strength and stability of the core member 204. Also, in step 826, the core member 204 may be cut and/or sized to the desired length dimension L and width dimension W.

Figure 14:
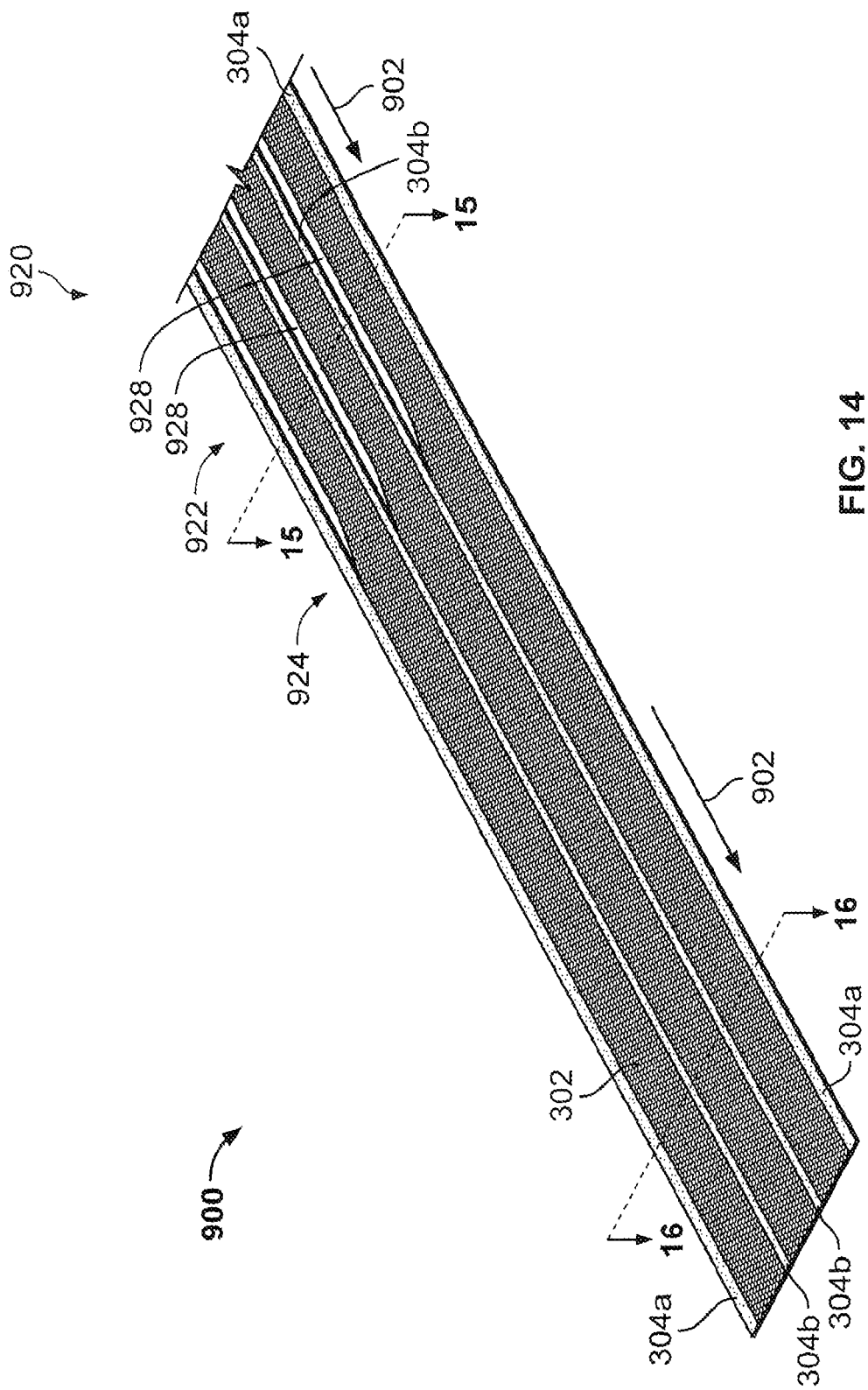
FIG. 14 is an isometric view of a plurality of composite panels on a production line, whereby the honeycomb structure is being joined to the reinforced bands.
Figure 15:
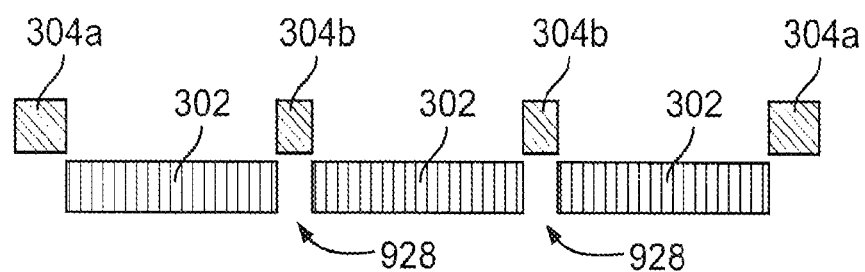
FIG. 15 is a cross-sectional view taken at line 15-15 of FIG. 14.
Figure 16:
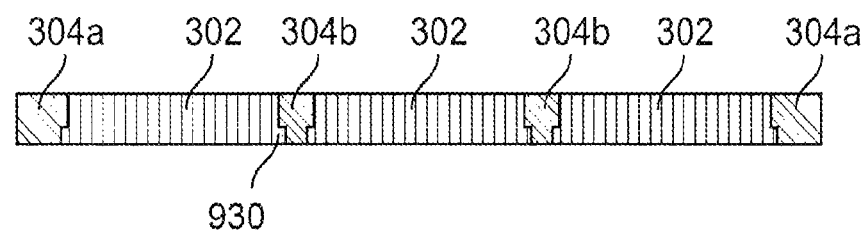
FIG. 16 is a cross-sectional view taken at line 16-16 of FIG. 14.

FIGS. 14-16 illustrate yet another exemplary process of joining the first structure 302 and second structure 304 and further illustrates the core member 204 provided as a continuous sheet 900 before, during, and after the second structure 304 is inserted into the first structure 302 and before the continuous sheet 900 may be sized and/or calibrated. In this particular embodiment, the process of joining the first structure 302 and the second structure may operate in a forward direction 902.

Figure 17:
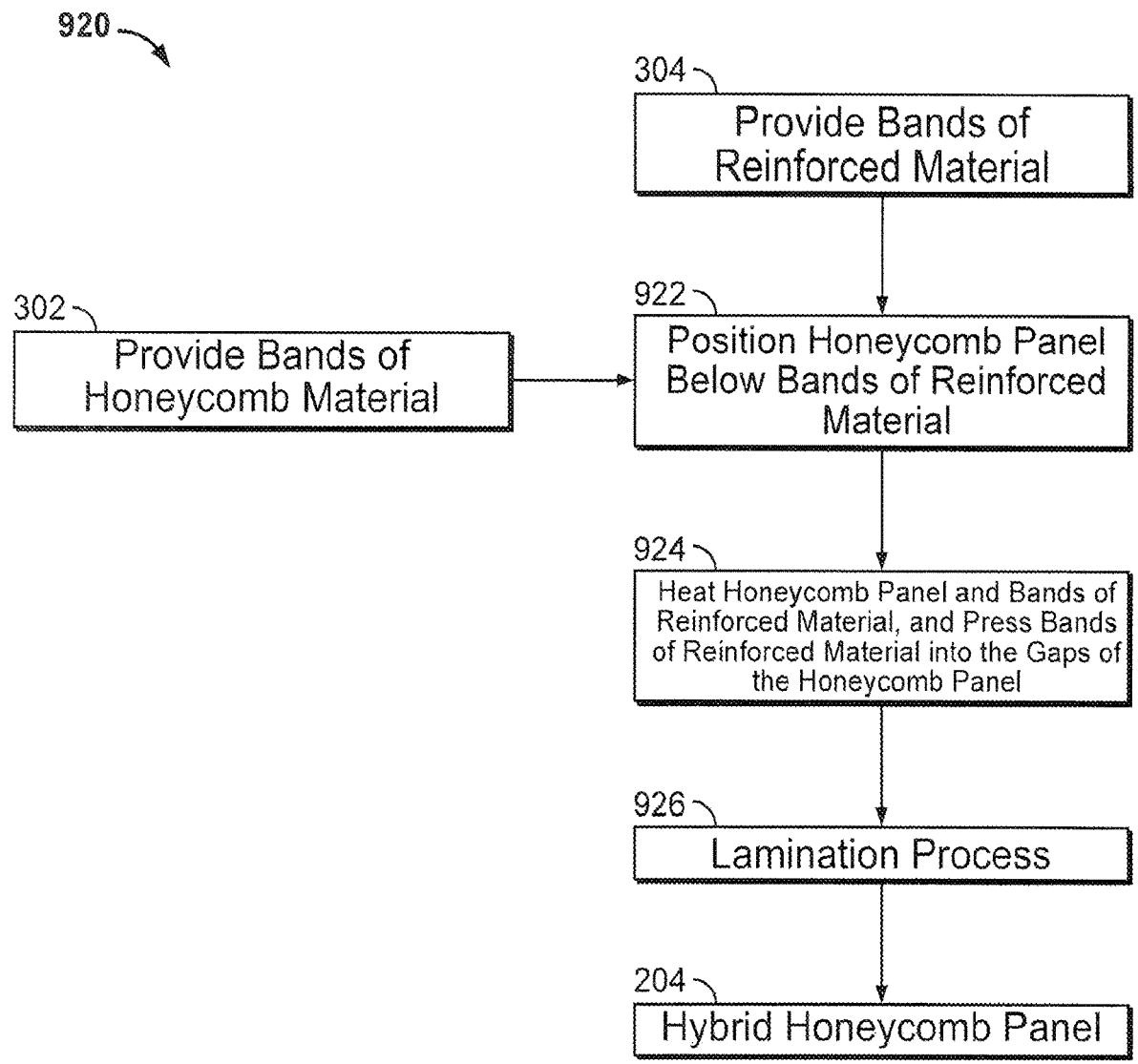
FIG. 17 is a flow chart for an example methodology used to make the core member of FIG. 3.

FIG. 17 depicts an illustrative process or method 920 for making and reinforcing the core member 204. The process 920 may be schematically illustrated with steps 922, 924, and 926. In some embodiments, the first structure 302 may be produced from the process 400 or the process 424, and the second structure 304 may be produced from the process 500. Further, the first structure 302 and the second structure 304 may be the starting materials for the process 920. In this particular embodiment, the second structure 302 may also include one or more gaps 928 (see FIGS. 14 and 15).

Similar to the process 700 and the process 820 described herein, it should be appreciated that, in some embodiments, the process 400 may be substituted with the process 424. As such, the first structure 302 entering the process 920 may be produced by the process 400 and/or the process 424. With that in mind, it should be understood that any reference to the process 400, hereinafter, may also be substituted with the process 424.

In the embodiment depicted in FIGS. 14-16, a production line for the process 500 may be located above a production line for the process 400. Further, the two production lines (i.e., the production line for process 400 and the production line for process 500) may operate in a similar direction. For example, as best seen in FIG. 14, the process 500 may be positioned above the process 400, and the process 400 and the process 500 may move in the forward direction 902. As such, in step 922, the first structure 302 may be positioned below the second structure 304. Further, in particular embodiments, the second structure 304 may be positioned above the first structure 302 so that edges of the second structure 304 may overlap edges of the first structure 302.

Next, in step 924, the first structure 302 and the second structure 304 may be heated. In particular embodiments, the first structure 302 and the second structure 304 may be heated to a predetermined temperature of about 40° C. to about 250° C. In some embodiments, the predetermined temperature may range between about 100° C. to about 200° C. or between about 160° C. to about 190° C.

Further, in step 924, the second structure 304 may be pressed or forced within the gaps 928 of the first structure 302. In the illustrative embodiment shown in FIG. 14, the first structure 302 may incline upward to meet the second structure 304 using a ramped conveyor belt (not shown).

In other embodiments, the exterior bands 304a may be positioned adjacent an edge of the first structure and/or the interior bands 304b may be positioned above the gaps 928 of the first structure 302. After positioning the second structure 304, the second structure may then be pressed within the first structure 302. In some embodiments, the second structure 304 may be pressed or forced within the gaps 928 of the first structure 302 using a platen press (not shown), or, in other embodiments, the second structure 304 may be pressed into the gaps 928 of the first structure 302 using a cylindrical roller (not shown). Further, in some embodiments and during step 924, a portion of the first structure 302 may be compressed by the second structure 304 to produce one or more compressed ledges 930 (see FIG. 16). As a result of step 924, the second structure 304 may be positioned within the first structure 302. Further, after inserting the second structure 304 into the first structure 302, the core member 204 may be cooled to a predetermined temperature.

In an illustrative embodiment, the gaps 928 of the first structure 302 may have a predetermined width. Further, the exterior bands 304a and the interior bands 304b may each, individually, have a predetermined width. In some embodiments, the gaps of the first structure 302 may have a predetermined width of about 1 centimeter to about 100 centimeters, or between about 5 centimeter to about 50 centimeters, or between about 10 centimeters to about 25 centimeters. In some embodiments, the gaps 928 may, independently, range between about 4 centimeters to about 8 centimeters. Further, in some embodiments, the exterior bands 304*a* and the interior bands 304*b* may have a predetermined width of about 1 centimeter to about 100 centimeters, or between about 5 centimeter to about 50 centimeters, or between about 10 centimeters to about 25 centimeters. In further embodiments, the exterior bands 304*a* and the interior bands 304*b* may, independently, range between about 4 centimeters to about 8 centimeters.

In some embodiments, a width of the exterior bands 304*a* and a width of the interior bands 304*b* may be larger than a width of the gaps 928. As such, during step 924, an edge of the exterior bands 304*a* and/or an edge of the interior bands 304*b* may compress a portion of the first structure 302 to produce one or more ledges 930.

Next, in step 926, a lamination process may occur, which may act to manufacture the material into multiple layers to increase the strength and stability of the core member 204. Also, in step 926, the core member 204 may be cut and/or sized to the desired length dimension L and width dimension W.

The core member 204 and resulting composite panel 112 discussed herein provide for a continuous process that produces composite panels that have a reduced weight with specifically dimensioned rigidity provided in select locations throughout the composite panel by reinforced materials. The reinforced areas can be specifically provided in areas of fastening and/or where higher compressive strength is needed in the panel.

Although the composite panel 112 and the core member 204 discussed herein have been discussed with respect to a tractor trailer application, it should be appreciated that the composite panel 112, core member 204, and/or any associated parts may be used in other applications such as, for example, other automotive and transportation applications, furniture applications, architecture applications and building materials, packing materials and logistics applications, aerospace applications, and the like.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

I claim:

1. A composite panel configured for a use in a sidewall and a door of a tractor trailer comprising:
   an outer sheet;
   an inner sheet; and
   a core member positioned between the inner sheet and the outer sheet and corresponding to a shape and size of the inner sheet and the outer sheet to define ends that include exposed edges of the core member,
   wherein the core member includes a partially hollow structure and a plurality of reinforced strips, and
   wherein the plurality of reinforced strips comprise at least one interior band and at least one external band, and extend longitudinally at least through the core member to divide the partially hollow structure into at least two segments, and
   wherein the plurality of reinforced strips have substantially the same composition.

2. The composite panel of claim 1, wherein the outer sheet and the inner sheet comprise a material selected from the group consisting of a metal, a fibre-reinforced plastic, and a glass reinforced plastic.

3. The composite panel of claim 2, wherein the partially hollow structure is provided as a hollow webbed structure comprising a plurality of cells that are one of hexagonal, square, parallelogram, or triangular in shape.

4. The composite panel of claim 1, wherein the at least one interior band is positioned within the partially hollow structure.

5. The composite panel of claim 4, wherein the at least one external band is positioned around a perimeter of the partially hollow structure.

6. The composite panel of claim 1, wherein the at least one external band has a predetermined width of about 4 centimeters to about 8 centimeters.

7. The composite panel of claim 1, wherein the at least one interior band has a predetermined width of about 4 centimeters to about 8 centimeters.

8. The core of claim 1, wherein the partially hollow structure and the plurality of reinforced strips are welded together.

9. A core for a use in a composite panel, the core comprising:
   a first material provided in a form of a partially hollow structure; and
   a second material provided in a form of a plurality of reinforced strips, wherein at least one of the reinforced strips extends longitudinally through the partially hollow structure to divide the partially hollow structure into at least two segments, and at least one of the reinforced strips is positioned around a perimeter of the partially hollow structure to be exposed along an end of the composite panel, and wherein the plurality of reinforced strips have substantially the same composition.

10. The core of claim 9, wherein the first material is a hollow webbed structure.

11. The core of claim 9, wherein the first material comprises one or more spaces for receiving the second material.

12. The core of claim 11, wherein the core is configured to be coupled to a portion of a tractor trailer.

13. The core of claim 9, wherein the first material and the second material are welded together.

* * * * *